(12) United States Patent
Fiumara et al.

(10) Patent No.: US 11,722,380 B2
(45) Date of Patent: Aug. 8, 2023

(54) UTILIZING MACHINE LEARNING MODELS TO DETERMINE CUSTOMER CARE ACTIONS FOR TELECOMMUNICATIONS NETWORK PROVIDERS

(71) Applicant: Accenture Global Solutions Limited, Dublin (IE)

(72) Inventors: Thomas Fiumara, Milan (IT); Marta Castrigno, Milan (IT); Luigi Tripputi, Milan (IT); Marco Grigoletti, Milan (IT); Jessica Gobetti, Canegrate (IT)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 17/094,664

(22) Filed: Nov. 10, 2020

(65) Prior Publication Data

US 2022/0150132 A1   May 12, 2022

(51) Int. Cl.
*H04L 41/16* (2022.01)
*H04L 41/5067* (2022.01)
(Continued)

(52) U.S. Cl.
CPC .......... *H04L 41/16* (2013.01); *G06F 18/214* (2023.01); *G06F 21/6254* (2013.01);
(Continued)

(58) Field of Classification Search
CPC ........................ H04L 41/16; H04L 41/5067
See application file for complete search history.

(56) References Cited

U.S. PATENT DOCUMENTS 9,929,926 B1 * 3/2018 Streete .................. H04L 43/045
10,262,079 B1   4/2019 Costabello et al.
(Continued)

FOREIGN PATENT DOCUMENTS

WO   2019048324 A1   3/2019

OTHER PUBLICATIONS

Data Anonymization., "Wayback Machine," Oct. 10, 2014, pp. 1-2, Retrieved from internet URL: https://web.archive.org/web/20141010094720/https://en.wikipedia.org/wiki/Data_anonymization, [retrieved from the internet on Oct. 20, 2021].
(Continued)

*Primary Examiner* — Brian Whipple
(74) *Attorney, Agent, or Firm* — Harrity & Harrity, LLP

(57) ABSTRACT

In some implementations, a device may receive, from a monitoring device, telecommunications data associated with a telecommunications network. The device may train a plurality of machine learning models with the telecommunications data to generate a plurality of trained machine learning models. The device may generate accuracy scores for the plurality of trained machine learning models based on training the plurality of machine learning models. The device may select an optimum machine learning model based on several indicators, such as the accuracy, precision, and/or the like. The device may provide the optimum machine learning model to the monitoring device associated with the telecommunications network. The optimum machine learning model may cause the monitoring device to process real time telecommunications data of the telecommunications network, with the optimum machine learning model, to determine a customer care action, and may cause the customer care action to be implemented in the telecommunications network.

20 Claims, 9 Drawing Sheets

(51) Int. Cl.
  *G06N 20/00* (2019.01)
  *H04L 43/062* (2022.01)
  *G06F 21/62* (2013.01)
  *G06F 18/214* (2023.01)

(52) U.S. Cl.
  CPC ......... *G06N 20/00* (2019.01); *H04L 41/5067* (2013.01); *H04L 43/062* (2013.01)

(56) References Cited

U.S. PATENT DOCUMENTS

| | | |
|---|---|---|
| 2018/0165475 A1 | 6/2018 | Veeramachaneni et al. |
| 2019/0094842 A1 | 3/2019 | Lee et al. |
| 2019/0370218 A1 | 12/2019 | Di Pietro et al. |
| 2020/0074476 A1 | 3/2020 | Ellison et al. |
| 2020/0194876 A1 | 6/2020 | Arora et al. |
| 2020/0304364 A1 | 9/2020 | Tapia et al. |
| 2021/0021469 A1* | 1/2021 | Sondur ............... H04L 41/0843 |
| 2021/0392049 A1* | 12/2021 | Jeuk ..................... H04L 47/829 |
| 2022/0012626 A1* | 1/2022 | Ben-Itzhak .......... G06K 9/6215 |
| 2022/0021659 A1* | 1/2022 | Goel ........................ G06N 5/04 |

OTHER PUBLICATIONS

Ismail et al., "On-Premise AI Platform: From DC to Edge," Proceedings of the 2019 2nd International Conference on Robot Systems and Applications, Aug. 2019, pp. 40-45, [retrieved from the Internet on May 27, 2022], [URL: https://dl.acm.org/doi/abs/10.1145/3378891.3378899].

* cited by examiner

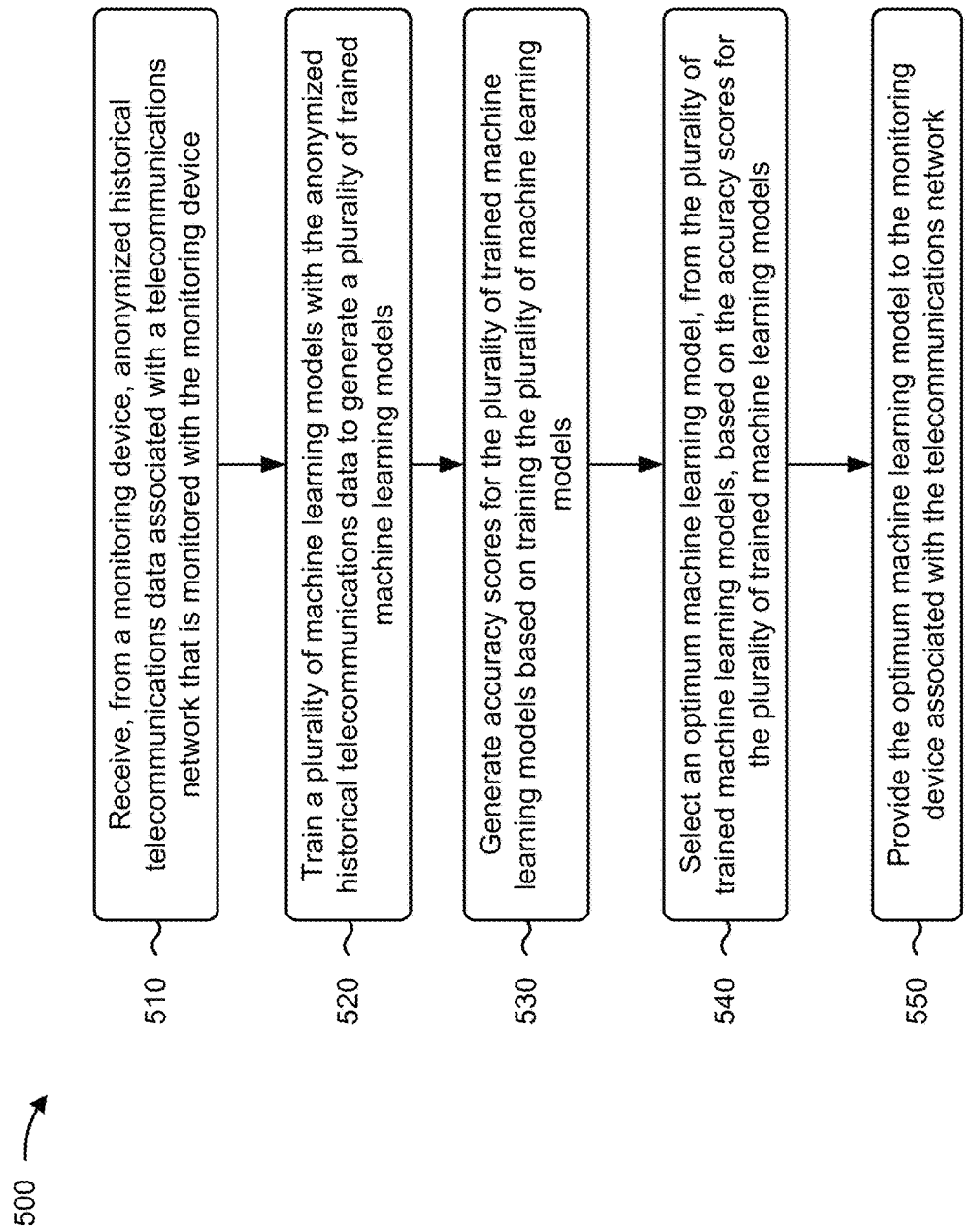

UTILIZING MACHINE LEARNING MODELS TO DETERMINE CUSTOMER CARE ACTIONS FOR TELECOMMUNICATIONS NETWORK PROVIDERS

BACKGROUND

Network, service, and/or customer experience management may include the use of a device and/or system that monitors a network for slow or failing components (e.g., customer premise equipment (CPE)), degradations in services, and/or negative customer experiences, and that provides a notification in case of network outages, service outages, or other network problems. The notification may include the sending of an alarm (e.g., via email, text, or the like) to a network administrator of the network. Network, service, and/or customer experience management may also include monitoring performance indicators associated with performance of the network, service indicators associated with a service, customer experience indicators associated with customer experiences, and/or the like, such as response time, availability, uptime, consistency metrics, reliability metrics, and/or the like.

SUMMARY

In some implementations, a method includes receiving, by a device and from a monitoring device, anonymized historical telecommunications data associated with a telecommunications network that is monitored with the monitoring device; training, by the device, a plurality of machine learning models with the anonymized historical telecommunications data to generate a plurality of trained machine learning models; generating, by the device, accuracy scores for the plurality of trained machine learning models based on training the plurality of machine learning models; selecting, by the device, an optimum machine learning model, from the plurality of trained machine learning models, based on the accuracy scores for the plurality of trained machine learning models; and providing, by the device, the optimum machine learning model to the monitoring device associated with the telecommunications network, wherein the optimum machine learning model causes the monitoring device to: process real time telecommunications data of the telecommunications network, with the optimum machine learning model, to determine a customer care action for the telecommunications network, and cause the customer care action to be applied to an end customer utilizing a service provided by a telecommunications provider associated with the telecommunications network. In this way, the monitoring device enables the identification of a possible issue affecting the end customer prior to a customer care operator taking an action. Further, by de-coupling the training of the machine learning models at a remote cloud site from the prediction of the customer care action at a local customer site, the invention improves data security by maintaining the customer data on-site instead of transmitting to remotely located servers.

In some implementations, a device includes one or more memories and one or more processors, communicatively coupled to the one or more memories, configured to receive, from a monitoring device, anonymized historical telecommunications data associated with a telecommunications network that is monitored with the monitoring device; train a plurality of machine learning models with the anonymized historical telecommunications data to generate a plurality of trained machine learning models; generate accuracy scores for the plurality of trained machine learning models based on training the plurality of machine learning models; select an optimum machine learning model, from the plurality of trained machine learning models, based on the accuracy scores for the plurality of trained machine learning models; provide the optimum machine learning model to the monitoring device; receive feedback associated with the monitoring device implementing the optimum machine learning model with the telecommunications network; and perform one or more actions based on the feedback.

In some implementations, a non-transitory computer-readable medium storing a set of instructions includes one or more instructions that, when executed by one or more processors of a device, cause the device to receive, from a monitoring device, anonymized historical telecommunications data associated with a telecommunications network that is monitored with the monitoring device; train a plurality of machine learning models with the anonymized historical telecommunications data to generate a plurality of trained machine learning models; generate accuracy scores for the plurality of trained machine learning models based on training the plurality of machine learning models; select an optimum machine learning model, from the plurality of trained machine learning models, based on the accuracy scores for the plurality of trained machine learning models; and provide the optimum machine learning model to the monitoring device associated with the telecommunications network to cause the monitoring device to implement the optimum machine learning model with the telecommunications network.

BRIEF DESCRIPTION OF THE DRAWINGS

FIG. 5 is a flowchart of an example process relating to determining customer care actions for telecommunications network providers.

DETAILED DESCRIPTION

Figure 1A:
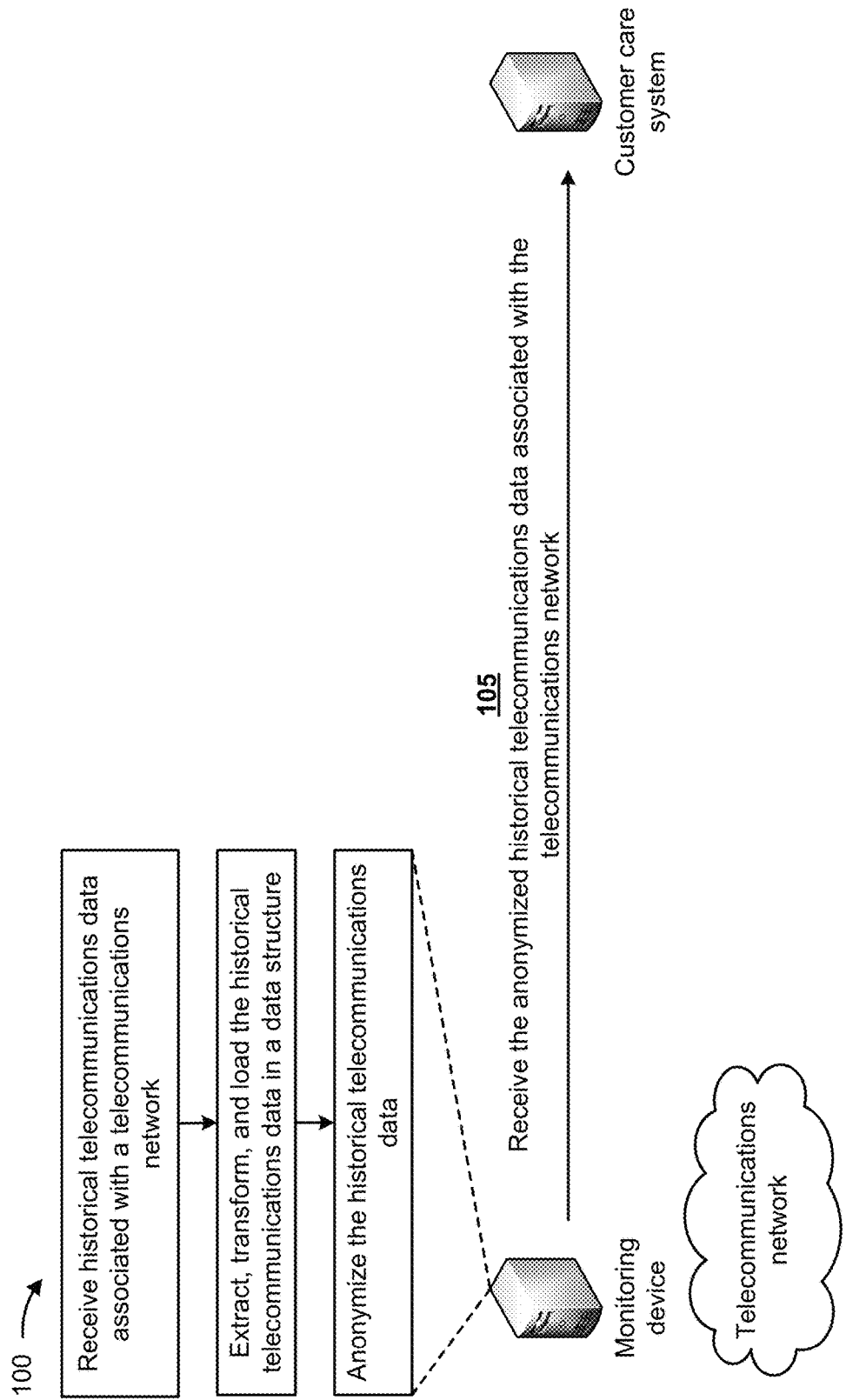
FIGS. 1A-1E are diagrams of an example implementation described herein.

The following detailed description of example implementations refers to the accompanying drawings. The same reference numbers in different drawings may identify the same or similar elements.

In a network operations center, network operations managers may interact with various hardware and software systems to monitor and manage a network. The systems may be monitoring alarms from the network and/or performance indicators associated with the network. The network operations managers, using the systems, may perform various actions, such as generating trouble tickets, performing recovery actions to process alarms, scheduling network maintenance, and/or the like.

As more and more devices are connected to a network, and more and more services are offered using the network, it becomes less feasible to maintain reliability and availability of the network and of the quality of service offered to the customers through manual network monitoring and/or management. For example, as network activity increases, network operations managers may be unable to handle the corresponding increase in the volume of trouble tickets generated and/or the volume of alarms. As a result, trouble tickets and/or alarms may take longer to process, which in turn may result in service outages, increased network downtime, inability to meet service-level requirements (e.g., as required by service-level agreements), and/or the like.

In some cases, prior to an alarm being generated, a customer may generate a notification (e.g., a trouble ticket) identifying an issue with the telecommunications network based on an unsatisfactory customer experience. For example, the customer may be experiencing reduced downlink speeds. The reduction in downlink speeds may not be sufficient to cause an alarm to be triggered but may result in the customer having an unsatisfactory customer experience. The hardware and software systems used to monitor and manage the network may be unable to identify the unsatisfactory experience of the customer prior to the customer generating the notification.

Some implementations described herein relate to a customer care system that generates and trains a machine learning model applied to customer care data to determine a customer care action associated with a telecommunications network. The customer care system de-couples the training of the machine learning model at a remote site from the prediction of the customer care action at a local customer site. In this way, the customer care system improves data security by maintaining the customer data at the local customer site instead of transmitting the customer data to the remote site. Further, computing resources of the customer care system, rather than computing resources of customer premise equipment (CPE) located at the local customer site, are utilized to train the machine learning model.

For example, the customer care system may receive, from a monitoring device associated with a telecommunications network, anonymized historical telecommunications data associated with the telecommunications network. The customer care system may train a plurality of machine learning models with the anonymized historical telecommunications data to generate a plurality of trained machine learning models. The customer care system may generate accuracy scores for the plurality of trained machine learning models based on training the plurality of machine learning models. The customer care system may select an optimum machine learning model, from the plurality of trained machine learning models, based on the accuracy scores for the plurality of trained machine learning models. The customer care system may provide the optimum machine learning model to the monitoring device associated with the telecommunications network.

The optimum machine learning model may cause the monitoring device to process, with the optimum machine learning model, real time telecommunications data of the telecommunications network to determine a risk score. The risk score may indicate a likelihood that a customer may report a technical issue relating to the telecommunications network. The monitoring device may determine a customer care action for resolving the technical issue. The monitoring device may cause the customer care action to be implemented in the telecommunications network.

In this way, the customer care system may proactively address issues associated with the telecommunications network, thereby avoiding generation of a notification by a customer, the triggering of alarms, service outages, network downtime, an inability to meet service-level agreements, and/or the like.

FIGS. 1A-1E are diagrams of an example 100 associated with determining customer care actions for telecommunications network providers. As shown in FIGS. 1A-1E, example 100 includes a customer care system and a monitoring device associated with a telecommunications network. The monitoring device may be included in a telecommunications network and may monitor the telecommunications network to determine a state of the telecommunications network. For example, the monitoring device may monitor data transmitted via a telecommunications network to identify a slow or failing network component, a degradation in service, a degradation in a customer experience, a network outage, a service outage, and/or another issue associated with the telecommunications network.

As shown in FIG. 1A, the monitoring device obtains historical telecommunications data associated with the telecommunications network. The monitoring device may obtain the historical telecommunications data periodically (e.g., daily, weekly, and/or monthly), in response to transmitting a request to one or more devices included in the telecommunications network, and/or based on an occurrence of an event (e.g., receiving a request from the customer care system, determining that a performance metric associated with the telecommunications network satisfies a threshold, and/or an occurrence of another type of event).

In some implementations, the monitoring device obtains the historical telecommunications data based on information provided by the customer care system. As an example, the customer care system may provide the monitoring device with information identifying a customer of the telecommunications network and/or a time period (e.g., one week, one month, one year, and/or the like). The customer care system may obtain historical telecommunications data associated with the customer and/or the time period based on the information provided by the customer care system.

The historical telecommunications data may include data identifying a status of a device associated with the telecommunications network, a performance metric associated with the device, a performance metric associated with the telecommunications network, and/or another type of telecommunications data. For example, the historical telecommunications data may include customer premise equipment (CPE) data associated with the telecommunications network, network device inventory data associated with the telecommunications network, customer call data associated with the telecommunications network, trouble ticket management (TTM) data, optical line terminal (OLT) data, and/or optical network terminal (ONT) data.

In some implementations, the historical telecommunications data comprises data that is transmitted within a customer service provider (CSP) environment and collected by the monitoring device. In some implementations, the monitoring device obtains the historical telecommunications data based on performing a health check on a system included in the telecommunications network. For example, the monitoring device may query a set of network addresses associated with the system and may obtain information regarding whether the set of network addresses direct the monitoring device to an intended portion of the system (e.g., an intended web site, an intended file, and/or the like). Additionally, or alternatively, the monitoring device may access one or more resources of the system via a set of credentials for the system, and may obtain information regarding the one or more resources of the system. For example, the monitoring device may perform a set of test logins using a set of usernames and a set of passwords to determine whether the system is properly granting access to files of the system, services of the system, and/or applications of the system.

Additionally, or alternatively, the monitoring device may determine a set of metrics associated with the system, such as an amount of time required to receive a response to a login attempt and/or an amount of available disk space associated with the set of data structures. For example, the monitoring device may connect to a database (e.g., an enterprise database, such as a structured query language (SQL) database, an Oracle database, or the like) of a particular data structure, and may obtain one or more metrics associated with the database, such as a query count and/or a latency associated with performing a query.

Additionally, or alternatively, the monitoring device may parse stored information associated with the system. For example, the monitoring device may obtain a set of log files associated with the system, and may parse the set of log files to determine information regarding a status of the system. In some implementations, the monitoring device may identify one or more issues associated with the system based on parsing the set of log files. For example, the monitoring device may parse the set of log files to identify a set of keywords included in the set of log files that correspond to an issue with the system, such as identifying the word "error" and/or the word "warning" included in the set of log files. In this case, the monitoring device may obtain information associated with identifying the set of keywords, such as a set of error identifiers included in the set of log files.

Additionally, or alternatively, the monitoring device may identify a set of blocking queries directed to the system based on information included in the set of log files. For example, the monitoring device may utilize stored information to classify queries identified in the set of log files as blocking queries (e.g., a query that is active for a database and prevents other queries or modifications from being performed on the database). Additionally, or alternatively, the monitoring device may parse the set of log files to determine if a background task is operating (e.g., a Java task, a .Net task, or the like). Similarly, the system monitoring device may determine whether one or more operating system specific services are operating on the system.

In some implementations, the historical telecommunications data includes information identifying a response action performed by the monitoring device and/or information identifying a result associated with performing the response action. For example, the monitoring device may perform a set of response actions based on a result of the health check. For example, the historical telecommunications data may include information indicating that the monitoring device identified a set of blocking queries, performed an action to terminate a set of blocking queries based on identifying the set of blocking queries, and/or whether the action was successful in terminating the set of blocking queries.

As another example, the historical telecommunications data may include information indicating that the monitoring device identified a known error based on an error identifier included in a log file, obtained instructions for correcting the known error, performed an action to correct the known error (e.g., based on the instructions), and/or whether the error was corrected based on performing the action. As another example, the historical telecommunications data may include information indicating that the monitoring device performed an action to cause resources of the system to be automatically reallocated based on metrics associated with the system (e.g., reallocating a set of memory resources from a first server to a second server and/or reallocating a set of processing resources from a first subsystem to a second subsystem) and information identifying a result of reallocating the resources (e.g., information identifying a performance metric of the system after the resources are reallocated).

In some implementations, the monitoring device processes the telecommunications data based on obtaining the telecommunications data. For example, the monitoring device may convert the telecommunications data to a common format, encrypt the telecommunications data, compress the telecommunications data, and/or anonymize the telecommunications data to remove information associated with a customer, the CSP, and/or the telecommunications network.

In some implementations, the monitoring device processes the telecommunications data based on a natural language processing (NLP) technique. As an example, the telecommunications data may include a notification (e.g., a trouble ticket) generated for a customer of the telecommunications network. The monitoring device may utilize an NLP technique to convert text included in the notification to lowercase text, remove punctuation, remove stop words, strip white space, perform stemming, perform lemmatization, and/or spell out abbreviations and acronyms. The monitoring device may store the processed telecommunications data as historical telecommunications data in a data structure (e.g., a database, a table, a list, and/or the like).

In some implementations, the monitoring device anonymizes the historical telecommunications data. The customer care system may anonymize the historical telecommunications data to remove data identifying a telecommunications network provider associated with the telecommunications network, data identifying customers of the telecommunications network provider, and/or another type of sensitive information. Alternatively, and/or additionally, the customer care system may anonymize the historical telecommunications data. For example, the customer care system may anonymize the historical telecommunications data based on the customer care system receiving the historical telecommunications data from the monitoring device, as described in greater detail below. In these implementations, the monitoring device may hash the historical telecommunications data prior to providing the historical telecommunications data to the customer care system. By hashing the historical telecommunications data, the monitoring device may ensure that sensitive information included in the historical telecommunications data is protected.

As shown by reference number 105, the customer care system receives the anonymized historical telecommunications data associated with the telecommunications network. In some implementations, the customer care system periodically (e.g., daily, weekly, monthly, and/or the like) receives the anonymized historical telecommunications data. For example, the customer care system may periodically receive the anonymized historical telecommunications data via a batch upload. Alternatively, and/or additionally, the customer care system may receive the anonymized historical telecommunications based on transmitting a request to the monitoring device.

In some implementations, the anonymized historical telecommunications data is included in a comma separated value (CSV) file. The monitoring device may write the stored historical telecommunications data to the CSV file. The monitoring device may sanitize the CSV file to remove sensitive information, such as information identifying a customer and/or information identifying the CSP. The monitoring device may encrypt and/or compress the sanitized CSV file and may transmit the encrypted and/or compressed CSV file to the customer care system.

The customer care system may process the anonymized historical telecommunications data based on receiving the anonymized historical telecommunications data from the monitoring device. For example, the customer care system may anonymize the historical telecommunications data, decompress the anonymized historical telecommunications data, decrypt the anonymized historical telecommunications data, and/or convert the CSV file to a format utilized by the customer care system (e.g., a format compatible with training a plurality of machine learning models, as described below).

Figure 1B:
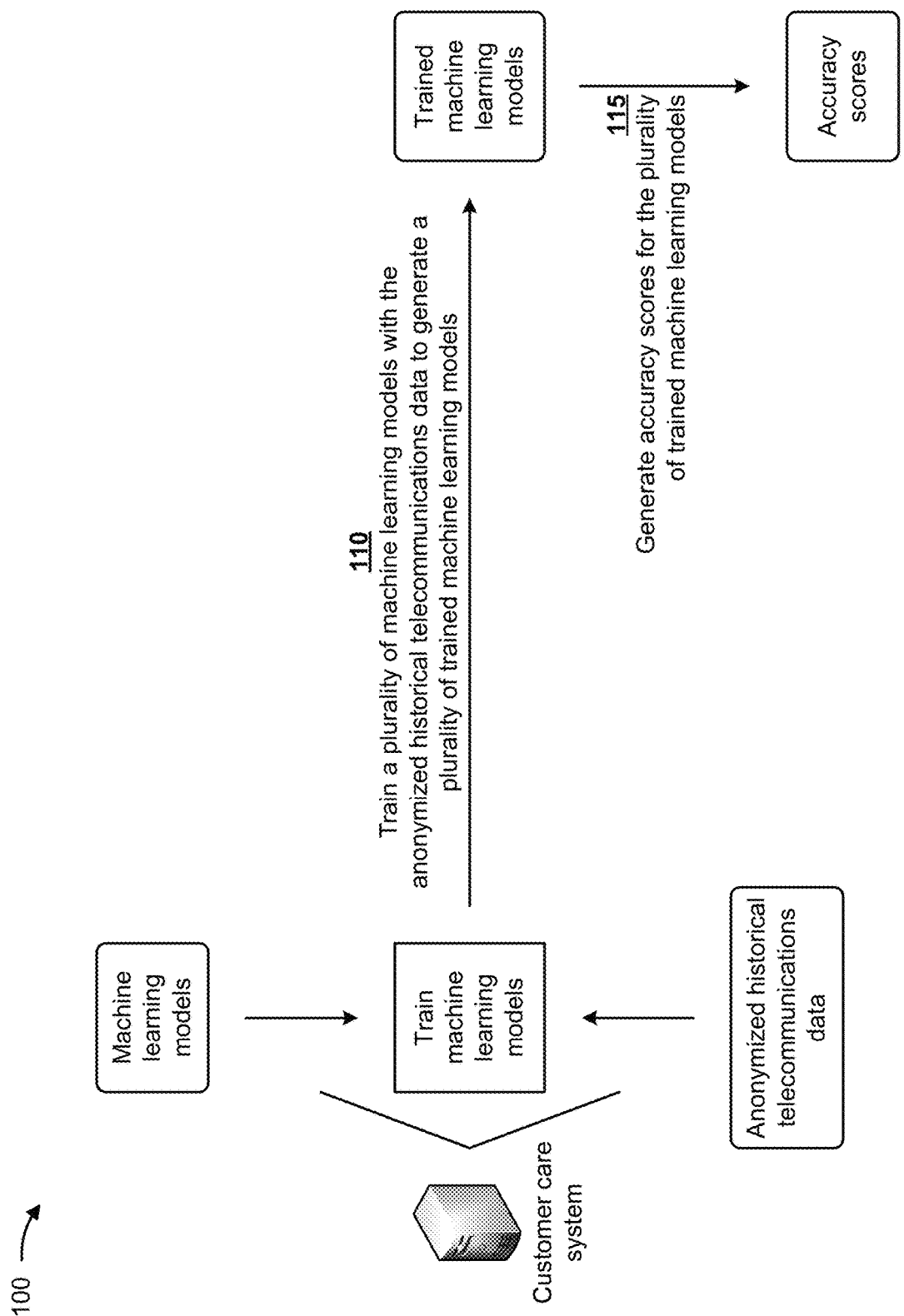

As shown in FIG. 1B, and by reference number 110, the customer care system trains a plurality of machine learning models with the anonymized historical telecommunications data to generate a plurality of trained machine learning models. The plurality of machine learning models may include a random forest model, a linear regression model, a neural network model, a convolutional neural network (CNN) model, a deep neural network (DNN) model, a Siamese network model, and/or another type of machine learning model. The customer care system may create, test, and/or update multiple predictive algorithms in parallel, and may identify the machine learning model with the best performance, as described in greater detail below.

The customer care system may train the plurality of machine learning models to generate an output indicating a risk score, a customer care action based on processing telecommunications data associated with the telecommunications network, and/or a confidence score. The risk score may reflect a likelihood that a customer will generate a notification indicating an issue associated with the telecommunications network. The customer care action may comprise an action associated with resolving the issue indicated in the notification. The confidence score may reflect a measure of confidence that the risk score is accurate for the customer and/or that the response action is accurate for the issue. In some implementations, the customer care system trains the plurality of machine learning models in a manner similar to that described below with respect to FIG. 2. In some implementations, the customer care system trains the plurality of machine learning models at the same time (e.g., in parallel).

As shown by reference number 115, the customer care system generates accuracy scores for the plurality of trained machine learning models. The customer care system may generate the accuracy scores for the plurality of machine learning models based on the confidence scores determined by the plurality of machine learning models. In some implementations, the customer care system may determine an accuracy score for a machine learning model, of the plurality of machine learning models, based on a highest confidence score determined by the machine learning model. For example, training the machine learning model may include iteratively processing multiple portions of the historical telecommunications data and determining a respective risk score, customer care action, and/or confidence score based on processing each of the multiple portions of the historical telecommunications data. The customer care system may determine the accuracy score for the machine learning model based on the highest confidence score determined by the machine learning model, a confidence score determined by the machine learning model for a last portion of the historical telecommunications data processed by the machine learning model, an average of the respective confidence scores determined by the machine learning model, a median confidence score of the respective confidence scores determined by the machine learning model, and/or the like.

Figure 1C:
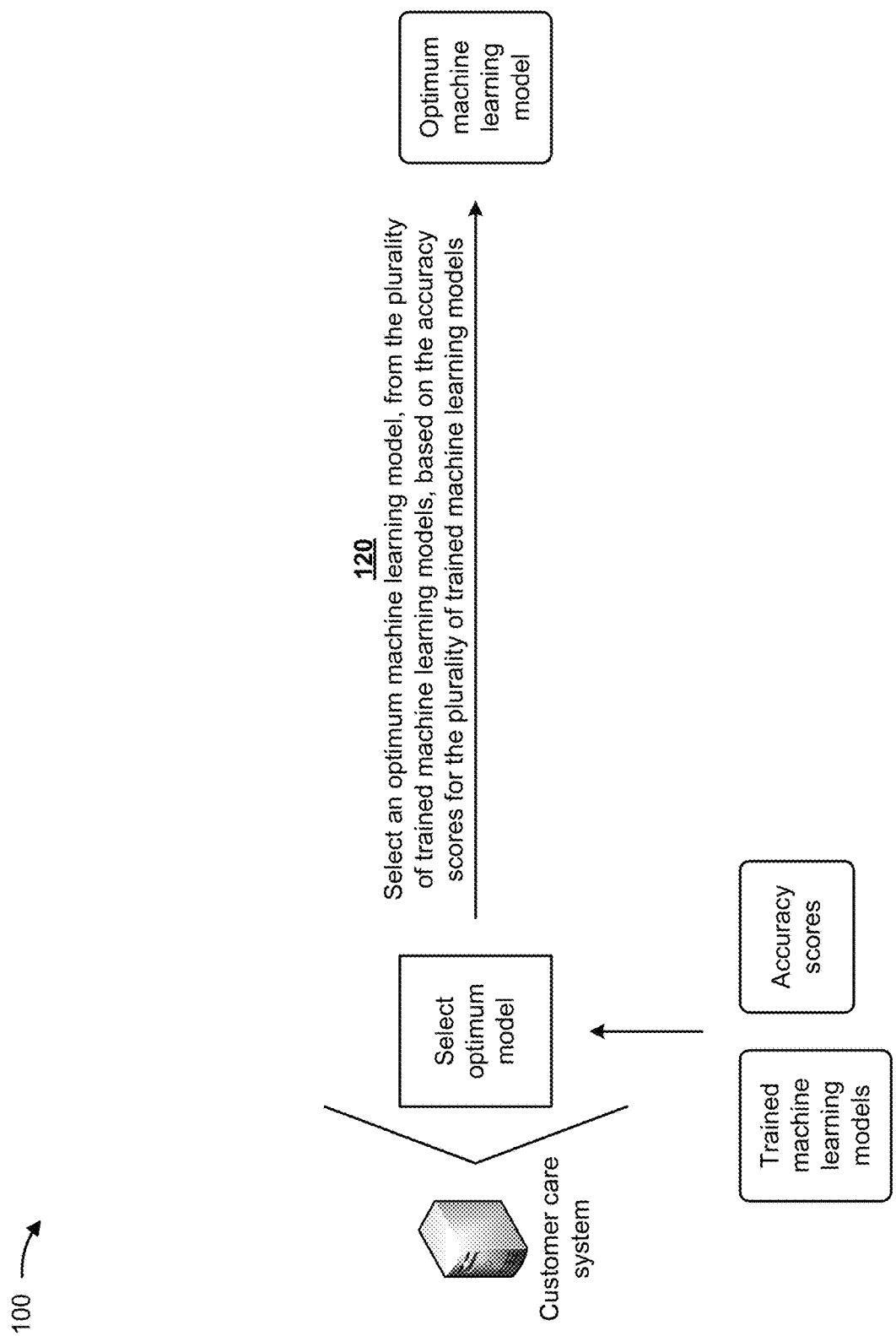

As shown in FIG. 1C, and by reference number 120, the customer care system selects an optimum machine learning model, from the plurality of trained machine learning models, based on the accuracy scores for the plurality of trained machine learning models. The customer care system may identify a machine learning model, of the plurality of machine learning models associated with the highest accuracy score relative to the accuracy scores associated with the other machine learning models. The customer care system may select the identified machine learning model as the optimum machine learning model based on the machine learning model being associated with the highest accuracy score.

Figure 1D:
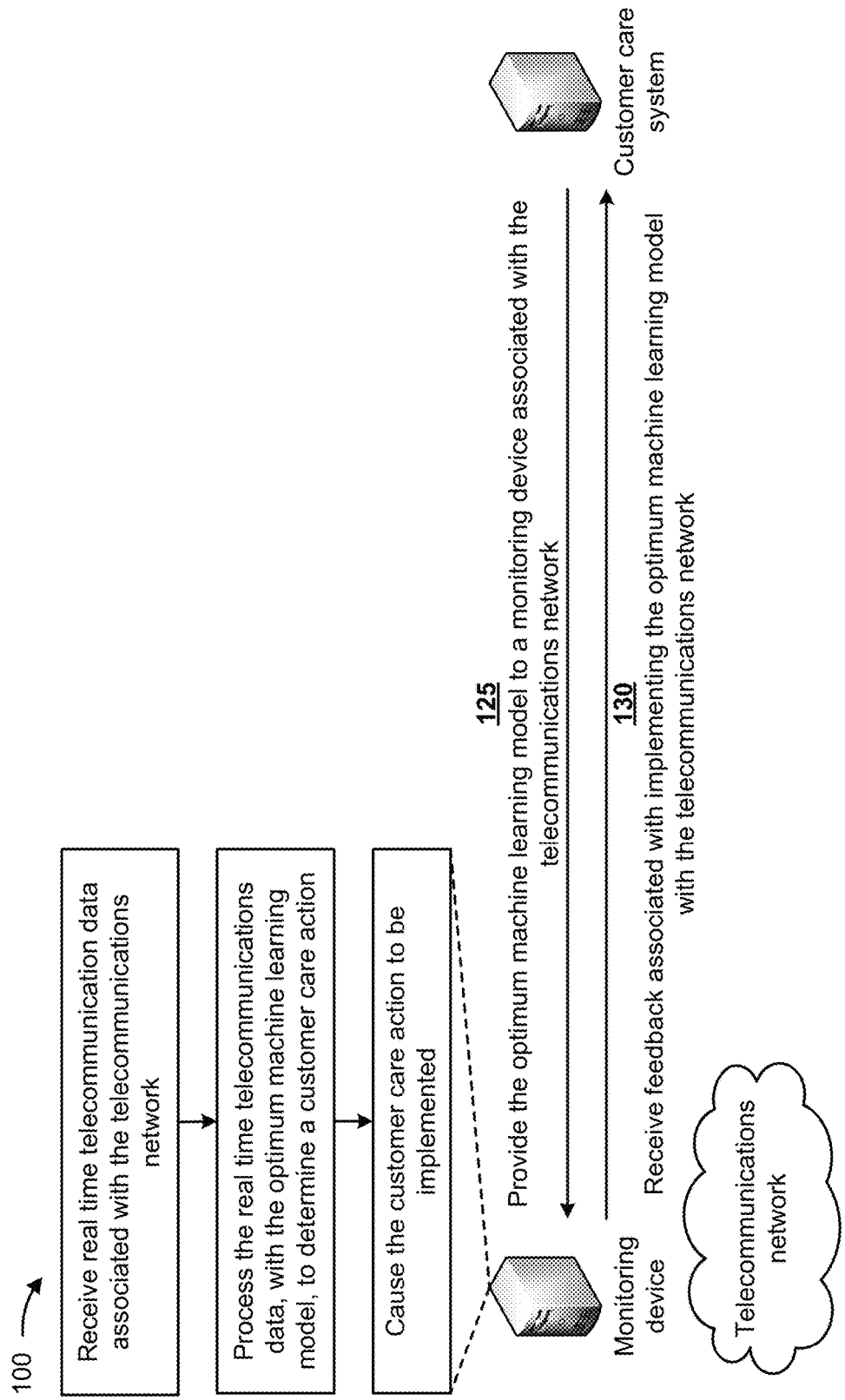

As shown in FIG. 1D, and by reference number 125, the customer care system provides the optimum machine learning model to a monitoring device associated with the telecommunications network. The customer care system may automatically provide and/or deploy the optimum machine learning model in the CSP premise (e.g., in containers deployed on the target client platform (e.g., the monitoring device)).

In some implementations, the customer care system provides the optimum machine learning model to the monitoring device based on selecting the optimum machine learning model from the plurality of trained machine learning models. In some implementations, the customer care system provides the optimum machine learning model to the monitoring device based on the monitoring device receiving telecommunications data associated with the telecommunications network. For example, as shown in FIG. 1D, the monitoring device receives real time telecommunications data associated with the telecommunications network and may request the optimum machine learning model from the customer care system based on receiving the real time telecommunications data.

As also shown in FIG. 1D, the monitoring device processes the real time telecommunications data, with the optimum machine learning model, to determine a customer care action. The monitoring device may provide the telecommunications data to the optimum machine learning model as an input. The optimum machine learning model may process the telecommunications data to generate an output. In some implementations, the output includes information indicating a risk score indicating a likelihood that a customer will generate a notification indicating an issue associated with the telecommunications data. Alternatively, and/or additionally, the output may include information identifying a customer care action for resolving the issue. In some implementations, the monitoring device utilizes the optimum machine learning model to process the telecommunications data in a manner similar to that described below with respect to FIG. 2.

In some implementations, the monitoring device determines the customer care action based on the risk score. The monitoring device may determine that the risk score satisfies a score threshold. The monitoring device may determine an issue associated with the risk score based on the risk score satisfying the score threshold. For example, the monitoring device may determine a performance metric associated with the telecommunications network based on the telecommunications data. The monitoring device may determine, based on the risk score satisfying the score threshold, that although the performance metric satisfies a minimum requirement, the performance metric indicates a degraded customer experience of a customer. The customer care system may access a data structure storing information mapping performance metrics to customer care actions to determine a customer care action associated with the performance metric.

By de-coupling the training of the machine learning model from the prediction of the customer care action, the customer care system improves data security by maintaining the customer data on site (e.g., at the monitoring device) instead of transmitting the customer data to the customer care system.

As shown in FIG. 1D, the monitoring device causes the customer care action to be implemented. In this way, the monitoring device may proactively intercept, prioritize, and solve technical issues associated with the telecommunications network prior to a customer generating a notification, an alarm being triggered, and/or the like.

In some implementations, the monitoring device may receive feedback associated with implementing the optimum machine learning model with the telecommunications network. For example, the feedback may include feedback indicating a result of implementing the customer action, such as feedback indicating that an issue associated with the telecommunications data was resolved, that the issue was not resolved, that a customer was satisfied with the result of implementing the customer action, and/or that the customer was not satisfied with the result. The monitoring device may provide the feedback to the customer care system. As shown by reference number 130, the customer care system receives the feedback associated with implementing the optimum machine learning model with the telecommunications network.

Figure 1E:
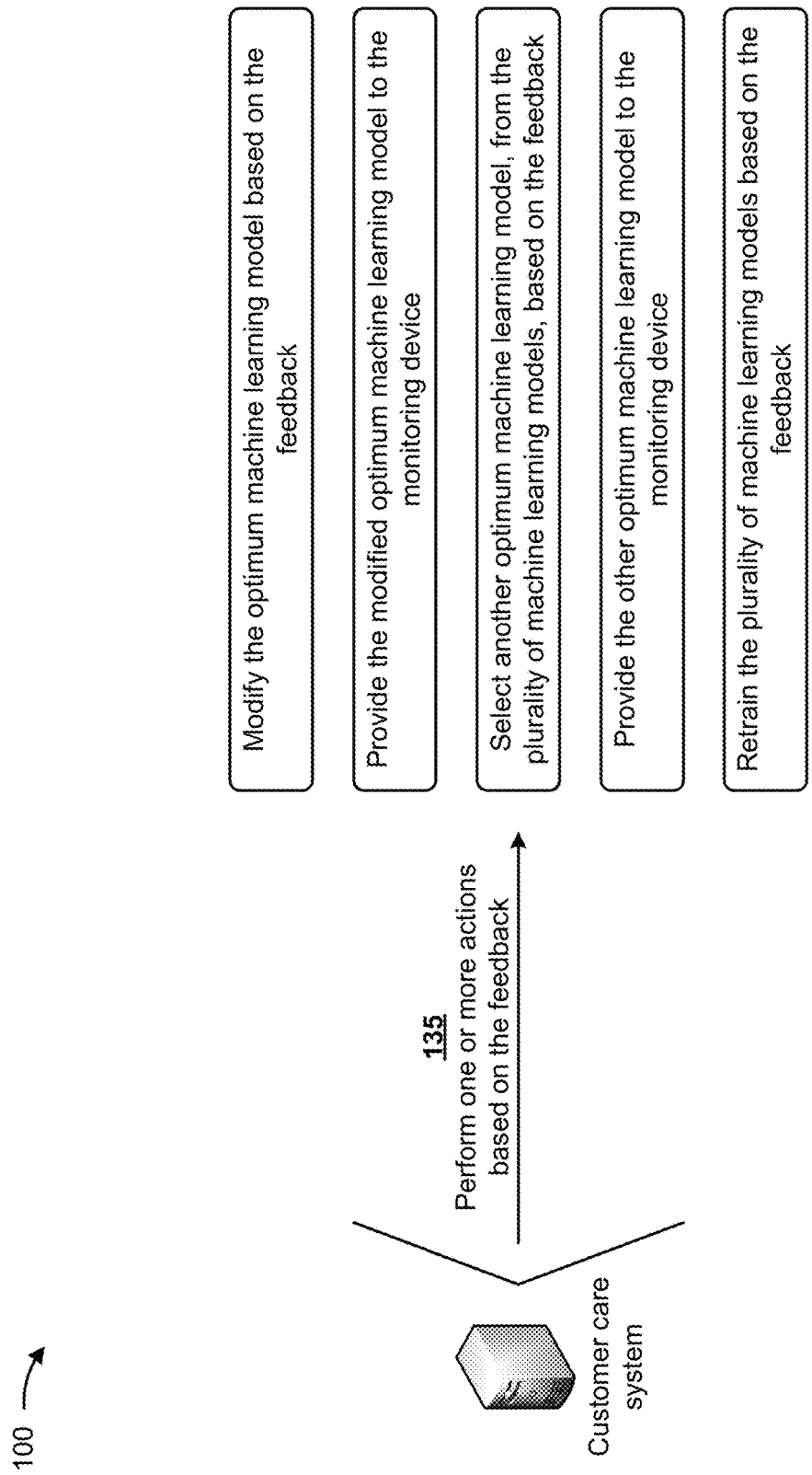

As shown in FIG. 1E, and by reference number 135, the customer care system performs one or more actions based on the feedback. In some implementations, the one or more actions include modifying the optimum machine learning model based on the feedback. For example, the customer care system may modify a set of weights associated with a neural network of the optimum machine learning model based on the feedback. The customer care system may provide the modified optimum machine learning model to the monitoring device. The monitoring device may utilize the modified optimum machine learning model to process telecommunications data, in a manner similar to that described above.

In some implementations, the one or more actions include selecting another optimum machine learning model, from the plurality of machine learning models, based on the feedback. For example, the customer care system may receive feedback from a plurality of monitoring devices and/or over a period of time (e.g., a day, a week, a month, and/or the like). The feedback may indicate that the risk scores and/or the customer care actions were incorrectly determined based on the telecommunications data. The customer care system may select another optimum machine learning model, from the plurality of machine learning models, based on the feedback indicating that the risk scores and/or the customer care actions were incorrectly determined. In some implementations, the customer care system may select the other optimum machine learning model based on the accuracy scores determined for the plurality of machine learning models.

The customer care system may provide the other optimum machine learning model to the monitoring device based on selecting the other optimum machine learning model. The monitoring device may utilize the other optimum machine learning model to process telecommunications data to determine risk scores and/or customer care actions in a manner similar to that described above.

In some implementations, the one or more actions include retraining the plurality of machine learning models based on the feedback. The feedback may include information identifying the telecommunications data processed by the optimum machine learning model, the risk score, the customer care action, and a result of implementing the customer care action. The customer care system may utilize the feedback as additional training data for retraining the plurality of machine learning models, thereby increasing the quantity of training data available for training the plurality of machine learning models. Accordingly, the customer care system may conserve computing resources associated with identifying, obtaining, and/or generating historical telecommunications data for training the plurality of machine learning models relative to other systems for identifying, obtaining, and/or generating historical telecommunications data for training the plurality of machine learning models.

Further, increasing the amount of training data available for training the plurality of machine learning models may improve a respective accuracy of each of the plurality of machine learning models. By improving the accuracy of the machine learning models, the customer care system may conserve computing resources associated with inaccurately determining a risk score, performing a customer care action associated with the risk score being inaccurately determined, and/or performing a customer care action that is inaccurately determined.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
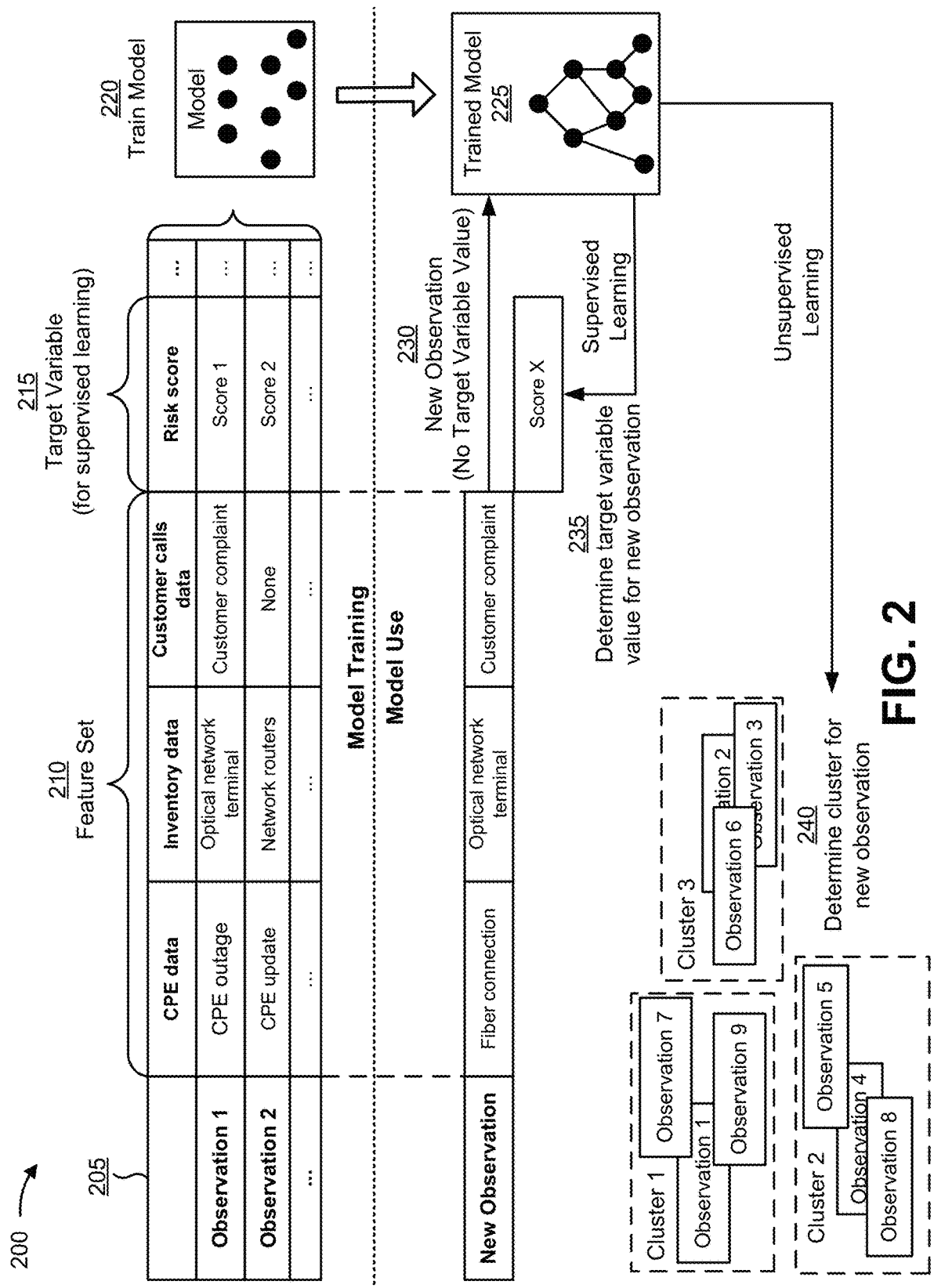
FIG. 2 is a diagram illustrating an example of training and using a machine learning model in connection with determining customer care actions for telecommunications network providers.

FIG. 2 is a diagram illustrating an example 200 of training and using a machine learning model in connection with determining a risk score indicating a likelihood that a customer will generate a complaint relating to an issue associated with a service provided by telecommunications network provider. The machine learning model training and usage described herein may be performed using a machine learning system. The machine learning system may include or may be included in a computing device, a server, a cloud computing environment, and/or the like, such as the customer care system described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the customer care system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the customer care system. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of CPE data, a second feature of inventory data, a third feature of customer calls data, and so on. As shown, for a first observation, the first feature may have a value of CPE outage, the second feature may have a value of optical network terminal, the third feature may have a value of customer complaint, and so on. These features and feature values are provided as examples, and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable is risk score, which has a value of Score 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of CPE data, a second feature of inventory data, a third feature of customer calls data, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of Score X for the target variable of Risk Score for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a high risk cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a low risk cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to determining a risk score indicating a likelihood that a customer will generate a complaint relating to an issue associated with a service provided by the telecommunications network provider. The machine learning system enables recognition and/or identification of tens, hundreds, thousands, or millions of features and/or feature values for tens, hundreds, thousands, or millions of observations, thereby increasing accuracy and consistency and reducing delay associated with determining risk scores indicating likelihoods that customers will generate complaints relating to an issue associated with a service provided by telecommunications network provider relative to requiring computing resources to be allocated for tens, hundreds, or thousands of operators to manually determine customer care actions for telecommunications network providers using the features or feature values.

As indicated above, FIG. 2 is provided as an example. Other examples may differ from what is described in connection with FIG. 2.

Figure 3:
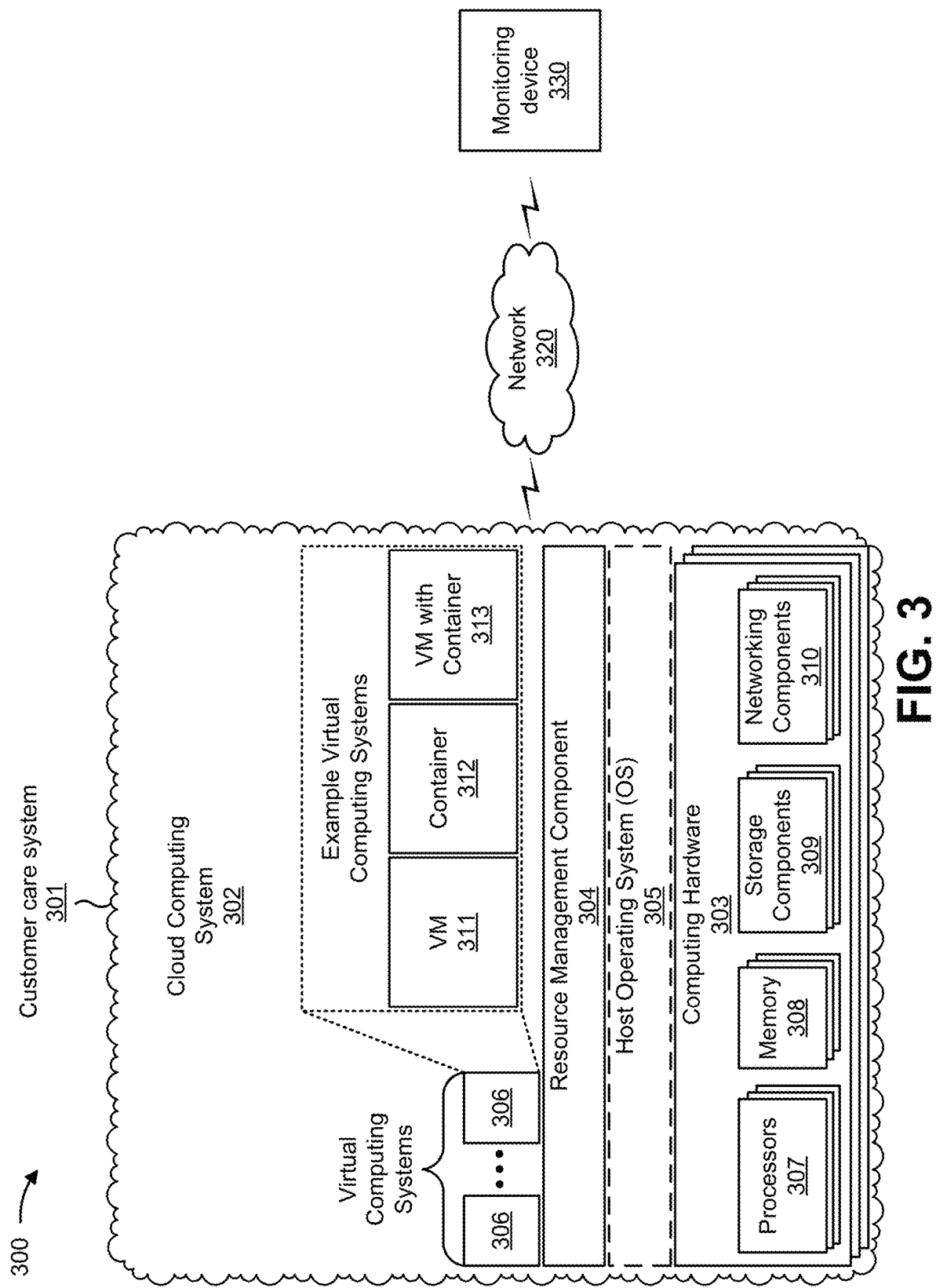
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a customer care system 301, which may include one or more elements of and/or may execute within a cloud computing system 302. The cloud computing system 302 may include one or more elements 303-313, as described in more detail below. As further shown in FIG. 3, environment 300 may include a network 320 and/or a monitoring device 330. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the customer care system 301 may include one or more elements 303-313 of the cloud computing system 302, may execute within the cloud computing system 302, and/or may be hosted within the cloud computing system 302, in some implementations, the customer care system 301 may not be cloud-based (e.g., may be implemented outside of a cloud computing system) or may be partially cloud-based. For example, the customer care system 301 may include one or more devices that are not part of the cloud computing system 302, such as device 400 of FIG. 4, which may include a standalone server or another type of computing device. The customer care system 301 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or the like, and/or a combination of these or other types of networks. The network 320 enables communication among the devices of environment 300.

Monitoring device 330 includes one or more devices capable of receiving, generating, storing, processing, providing, and/or routing information associated with determining customer care actions for telecommunications network providers, as described elsewhere herein. The monitoring device 330 may include a communication device and/or a computing device. For example, the monitoring device 330 may include a server, an application server, a client server, a web server, a database server, a host server, a proxy server, a virtual server (e.g., executing on computing hardware), a server in a cloud computing system, a device that includes computing hardware used in a cloud computing environment, or a similar type of device. The monitoring device 330 may communicate with one or more other devices of environment 300, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
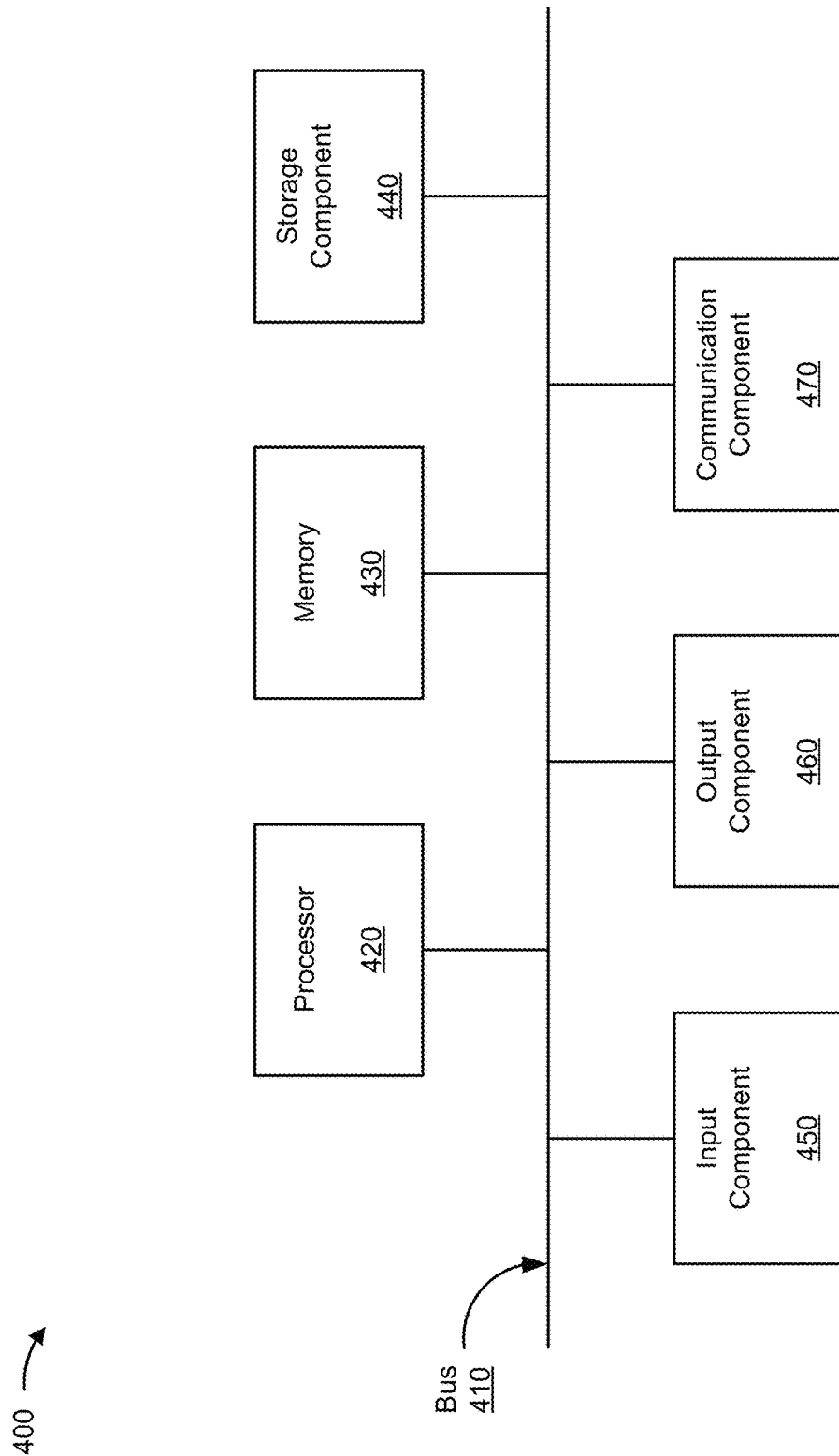
FIG. 4 is a diagram of example components of one or more devices of FIG. 3.

FIG. 4 is a diagram of example components of a device 400, which may correspond to customer care system 301 and/or monitoring device 330. In some implementations, customer care system 301 and/or monitoring device 330 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 associated with utilizing machine learning models to determine customer care actions for telecommunications network providers. In some implementations, one or more process blocks of FIG. 5 may be performed by a device (e.g., customer care system 301). In some implementations, one or more process blocks of FIG. 5 may be performed by another device or a group of devices separate from or including the device, such as a monitoring device (e.g., monitoring device 330). Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include receiving, from a monitoring device, anonymized historical telecommunications data associated with a telecommunications network that is monitored with the monitoring device (block 510). For example, the device may receive, from a monitoring device, anonymized historical telecommunications data associated with a telecommunications network that is monitored with the monitoring device, as described above. In some implementations, the device periodically receives the anonymized historical telecommunications data via a batch upload.

The monitoring device may receive historical telecommunications data from the telecommunications network and may anonymize the historical telecommunications data to generate the anonymized historical telecommunications data. The anonymized historical telecommunications data may include one or more of anonymized historical customer premise equipment data associated with the telecommunications network, anonymized historical network device inventory data associated with the telecommunications network, or anonymized historical customer call data associated with the telecommunications network. In some implementations, the anonymized historical telecommunications data is encrypted, compressed, and anonymized to remove data identifying a telecommunications network provider and data identifying customers of the telecommunications network provider.

As further shown in FIG. 5, process 500 may include training a plurality of machine learning models with the anonymized historical telecommunications data to generate a plurality of trained machine learning models (block 520). For example, the device may train a plurality of machine learning models with the anonymized historical telecommunications data to generate a plurality of trained machine learning models, as described above. The plurality of machine learning models may include one or more random forest models, one or more linear regression models, and one or more neural network models.

In some implementations, the device may train the plurality of machine learning models at the same time with the anonymized historical telecommunications data. In some implementations, prior to training the plurality of machine learning models, the device may convert the anonymized historical telecommunications data into a format compatible with training the plurality of machine learning models.

As further shown in FIG. 5, process 500 may include generating accuracy scores for the plurality of trained machine learning models based on training the plurality of machine learning models (block 530). For example, the device may generate accuracy scores for the plurality of trained machine learning models based on training the plurality of machine learning models, as described above.

As further shown in FIG. 5, process 500 may include selecting an optimum machine learning model, from the plurality of trained machine learning models, based on the accuracy scores for the plurality of trained machine learning models (block 540). For example, the device may select an optimum machine learning model, from the plurality of trained machine learning models, based on the accuracy scores for the plurality of trained machine learning models, as described above.

As further shown in FIG. 5, process 500 may include providing the optimum machine learning model to the monitoring device associated with the telecommunications network (block 550). For example, the device may provide the optimum machine learning model to the monitoring device associated with the telecommunications network, as described above. In some implementations, the optimum machine learning model causes the monitoring device to process real time telecommunications data of the telecommunications network, with the optimum machine learning model, to determine a customer care action for the telecommunications network, and to cause the customer care action to be implemented in the telecommunications network.

The optimum machine learning model may cause the monitoring device to generate a risk score based on the real time telecommunications data. The monitoring device may determine a customer care action for the telecommunications based on the risk score. The monitoring device may cause the customer care action to be applied to an end customer utilizing a service provided by a telecommunications provider associated with the telecommunications network.

In some implementations, the device receives feedback associated with the monitoring device implementing the optimum machine learning model with the telecommunications network. The device may perform one or more actions based on the feedback. The one or more actions may comprise one or more of modifying the optimum machine learning model, based on the feedback and to generate a modified optimum machine learning model, and providing the modified optimum machine learning model to the monitoring device, selecting another optimum machine learning model, from the plurality of machine learning models, based on the feedback, and providing the other optimum machine learning model to the monitoring device, or retraining the plurality of machine learning models based on the feedback.

In some implementations, the device may receive, from the monitoring device, additional anonymized historical telecommunications data associated with the telecommunications network. The device may retrain the plurality of trained machine learning models with the additional anonymized historical telecommunications data.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device and from a monitoring device, anonymized historical telecommunications data associated with a telecommunications network that is monitored with the monitoring device,
      wherein the monitoring device is a separate device from the device,
      wherein the monitoring device is configured to perform a set of test logins using a set of usernames and passwords,
      wherein the set of usernames and passwords is anonymized to create the anonymized historical telecommunications data,
      wherein the monitoring device is configured to determine a customer care action to resolve a technical issue with the telecommunications network, and
      wherein the monitoring device is configured to cause the customer care action to be implemented in the telecommunications network;
   training, by the device, a plurality of machine learning models with the anonymized historical telecommunications data to generate a plurality of trained machine learning models;
   generating, by the device, accuracy scores for the plurality of trained machine learning models based on training the plurality of machine learning models;
   selecting, by the device, an optimum machine learning model, from the plurality of trained machine learning models, based on the accuracy scores for the plurality of trained machine learning models; and
   providing, by the device, the optimum machine learning model to the monitoring device associated with the telecommunications network,
      wherein the optimum machine learning model causes the monitoring device to:
         process real time telecommunications data of the telecommunications network, with the optimum machine learning model, to determine the customer care action for the telecommunications network, and
cause the customer care action to be applied to an end customer utilizing a service provided by a telecommunications provider associated with the telecommunications network.

2. The method of claim 1, wherein the anonymized historical telecommunications data includes one or more of:
anonymized historical customer premise equipment data associated with the telecommunications network,
anonymized historical network device inventory data associated with the telecommunications network, or
anonymized historical customer call data associated with the telecommunications network.

3. The method of claim 1, wherein the anonymized historical telecommunications data is encrypted, compressed, and anonymized to remove data identifying a telecommunications network provider and customers of the telecommunications network provider.

4. The method of claim 1, further comprising:
receiving feedback associated with the monitoring device implementing the optimum machine learning model with the telecommunications network; and
performing one or more actions based on the feedback.

5. The method of claim 4, wherein performing the one or more actions comprises one or more of:
modifying the optimum machine learning model, based on the feedback and to generate a modified optimum machine learning model, and providing the modified optimum machine learning model to the monitoring device;
selecting another optimum machine learning model, from the plurality of machine learning models, based on the feedback, and providing the other optimum machine learning model to the monitoring device; or
retraining the plurality of machine learning models based on the feedback.

6. The method of claim 1, wherein the monitoring device receives historical telecommunications data from the telecommunications network, and anonymizes the historical telecommunications data to generate the anonymized historical telecommunications data.

7. The method of claim 1, wherein the plurality of machine learning models includes:
one or more random forest models,
one or more linear regression models, and
one or more neural network models.

8. A device, comprising:
one or more memories; and
one or more processors, communicatively coupled to the one or more memories, configured to:
receive, from a monitoring device, anonymized historical telecommunications data associated with a telecommunications network that is monitored with the monitoring device,
wherein the monitoring device is a separate device from the device,
wherein the monitoring device is configured to perform a set of test logins using a set of usernames and passwords,
wherein the set of usernames and passwords is anonymized to create the anonymized historical telecommunications data,
wherein the monitoring device is configured to determine a customer care action to resolve a technical issue with the telecommunications network, and
wherein the monitoring device is configured to cause the customer care action to be implemented in the telecommunications network;
train a plurality of machine learning models with the anonymized historical telecommunications data to generate a plurality of trained machine learning models;
generate accuracy scores for the plurality of trained machine learning models based on training the plurality of machine learning models;
select an optimum machine learning model, from the plurality of trained machine learning models, based on the accuracy scores for the plurality of trained machine learning models;
provide the optimum machine learning model to the monitoring device;
receive feedback associated with the monitoring device implementing the optimum machine learning model with the telecommunications network; and
perform one or more actions based on the feedback.

9. The device of claim 8, wherein the one or more processors are further configured to:
convert, prior to training the plurality of machine learning models, the anonymized historical telecommunications data into a format compatible with training the plurality of machine learning models.

10. The device of claim 8, wherein the one or more processors, when training the plurality of machine learning models with the anonymized historical telecommunications data, are configured to:
train the plurality of machine learning models, at a same time, with the anonymized historical telecommunications data.

11. The device of claim 8, wherein the one or more processors, when providing the optimum machine learning model to the monitoring device, are configured to:
cause the monitoring device to implement the optimum machine learning model with the telecommunications network.

12. The device of claim 8, wherein the optimum machine learning model causes the monitoring device to:
generate a risk score based on real time telecommunications data,
determine the customer care action for the telecommunications network based on the risk score, and
cause the customer care action to be implemented in the telecommunications network.

13. The device of claim 8, wherein the one or more processors, when receiving the anonymized historical telecommunications data, are configured to:
periodically receive the anonymized historical telecommunications data via batch upload.

14. The device of claim 8, wherein the one or more processors are further configured to:
receive, from the monitoring device, additional anonymized historical telecommunications data associated with the telecommunications network; and
retrain the plurality of trained machine learning models with the additional anonymized historical telecommunications data.

15. A non-transitory computer-readable medium storing a set of instructions, the set of instructions comprising:
one or more instructions that, when executed by one or more processors of a device, cause the device to:

receive, from a monitoring device, anonymized historical telecommunications data associated with a telecommunications network that is monitored with the monitoring device,
    wherein the monitoring device is a separate device from the device,
    wherein the monitoring device is configured to perform a set of test logins using a set of usernames and passwords,
    wherein the set of usernames and passwords is anonymized to create the anonymized historical telecommunications data,
    wherein the monitoring device is configured to determine a customer care action to resolve a technical issue with the telecommunications network, and
    wherein the monitoring device is configured to cause the customer care action to be implemented in the telecommunications network;
train a plurality of machine learning models with the anonymized historical telecommunications data to generate a plurality of trained machine learning models;
generate accuracy scores for the plurality of trained machine learning models based on training the plurality of machine learning models;
select an optimum machine learning model, from the plurality of trained machine learning models, based on the accuracy scores for the plurality of trained machine learning models; and
provide the optimum machine learning model to the monitoring device associated with the telecommunications network to cause the monitoring device to implement the optimum machine learning model with the telecommunications network.

16. The non-transitory computer-readable medium of claim 15, wherein the anonymized historical telecommunications data is encrypted, compressed, and anonymized to remove data identifying a telecommunications network provider and customers of the telecommunications network provider.

17. The non-transitory computer-readable medium of claim 15, wherein the one or more instructions further cause the device to:
    receive feedback associated with the monitoring device implementing the optimum machine learning model with the telecommunications network;
    modify the optimum machine learning model based on the feedback and to generate a modified optimum machine learning model; and
    provide the modified optimum machine learning model to the monitoring device.

18. The non-transitory computer-readable medium of claim 15, wherein the one or more instructions further cause the device to:
    convert, prior to training the plurality of machine learning models, the anonymized historical telecommunications data into a format compatible with training the plurality of machine learning models.

19. The non-transitory computer-readable medium of claim 15, wherein the one or more instructions, that cause the device to train the plurality of machine learning models with the anonymized historical telecommunications data, cause the device to:
    train the plurality of machine learning models, at a same time, with the anonymized historical telecommunications data.

20. The non-transitory computer-readable medium of claim 15, wherein the one or more instructions further cause the device to:
    receive, from the monitoring device, additional anonymized historical telecommunications data associated with the telecommunications network; and
    retrain the plurality of trained machine learning models with the additional anonymized historical telecommunications data.

\* \* \* \* \*